United States Patent
Frenger et al.

(10) Patent No.: US 11,777,573 B2
(45) Date of Patent: Oct. 3, 2023

(54) METHOD AND NETWORK NODE WITH IMPROVED BEAMFORMING

(71) Applicant: Telefonaktiebolaget LM Ericsson (publ), Stockholm (SE)

(72) Inventors: Pål Frenger, Linköping (SE); Emil Björnson, Hägersten (SE); Erik G. Larsson, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/639,678

(22) PCT Filed: Sep. 20, 2019

(86) PCT No.: PCT/SE2019/050896
§ 371 (c)(1),
(2) Date: Mar. 2, 2022

(87) PCT Pub. No.: WO2021/054878
PCT Pub. Date: Mar. 25, 2021

(65) Prior Publication Data
US 2022/0294507 A1  Sep. 15, 2022

(51) Int. Cl.
H04B 7/06   (2006.01)
H01Q 3/40   (2006.01)
H04B 7/0495 (2017.01)

(52) U.S. Cl.
CPC ............ *H04B 7/0617* (2013.01); *H01Q 3/40* (2013.01); *H04B 7/0495* (2013.01)

(58) Field of Classification Search
CPC .... H04B 7/0617; H04B 7/0495; H04B 7/022; H04B 7/0413; H01Q 3/40; H01Q 21/28; H01Q 1/46

(Continued)

(56) References Cited

U.S. PATENT DOCUMENTS

2013/0076566 A1   3/2013   Jiang et al.
2017/0062948 A1   3/2017   Artemenko et al.
(Continued)

FOREIGN PATENT DOCUMENTS

WO   2018103897 A9   6/2018
WO   2019101290 A1   5/2019

OTHER PUBLICATIONS

International Search Report and Written Opinion dated Aug. 28, 2020 for International Application No. PCT/SE2019/050896 filed Sep. 20, 2019, consisting of 11-pages.
(Continued)

*Primary Examiner* — Fitwi Y Hailegiorgis
(74) *Attorney, Agent, or Firm* — Christopher & Weisberg, P.A.

(57) ABSTRACT

An antenna system includes at least a first antenna processing unit, APU1, and a second antenna processing unit, APU2, adjacently connected to each other through a serialized front haul. Each one of the APU1 and APU2 has at least two antenna elements. The antenna elements of APU1 are connected to their respective Radio Frequency, RF, chains via a first beamforming unit, and the antenna elements of APU2 are connected to their respective RF chains via a second beamforming unit. A network node configures the first beamforming unit and the second beamforming unit such that an absolute value of an angular difference between at least one of the beam directions generated by the first beamforming unit and each of the beam directions generated by the second beamforming unit exceeds or is equal to a threshold value.

20 Claims, 17 Drawing Sheets

(58) Field of Classification Search
USPC .......................................................... 375/267
See application file for complete search history.

(56) References Cited

U.S. PATENT DOCUMENTS

| | | |
|---|---|---|
| 2018/0351260 A1 | 12/2018 | Li et al. |
| 2019/0089434 A1 | 3/2019 | Rainish et al. |
| 2019/0229952 A1 | 7/2019 | Sun et al. |
| 2019/0268804 A1 | 8/2019 | Estella Aguerri et al. |
| 2020/0037301 A1* | 1/2020 | Park ................. H04W 72/0453 |
| 2020/0212978 A1* | 7/2020 | Zhao .................. H04B 7/0617 |

OTHER PUBLICATIONS

G. Interdonato et al.; Ubiquitous cell-free Massive MIMO communications; Eurasip Journal on Wireless Communications and Networking; 2019, consisting of 13-pages.

B. Jokanovic et al.; Advanced Antennas for Next Generation Wireless Access; 2017 13th International Conference on Advanced Technologies, Systems and Services in Telecommunications (TELSIKS); Oct. 18-20, 2017, consisting of 9-pages.

EPO Communication with Supplementary European Search Report dated May 23, 2023 for Patent Application No. 19945497.6, consisting of 5-pages.

\* cited by examiner

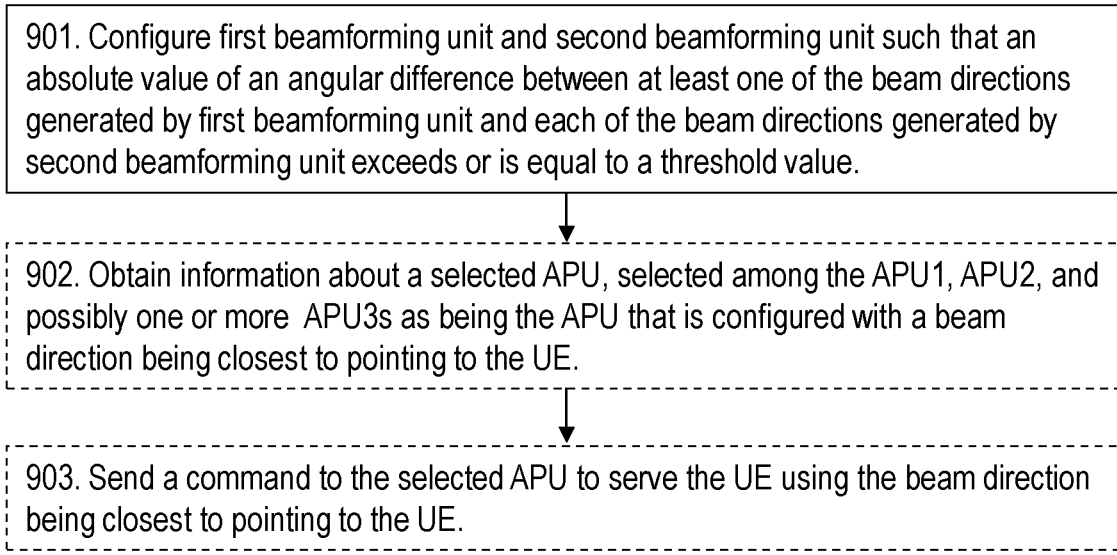
Fig. 9 Method in network node 110

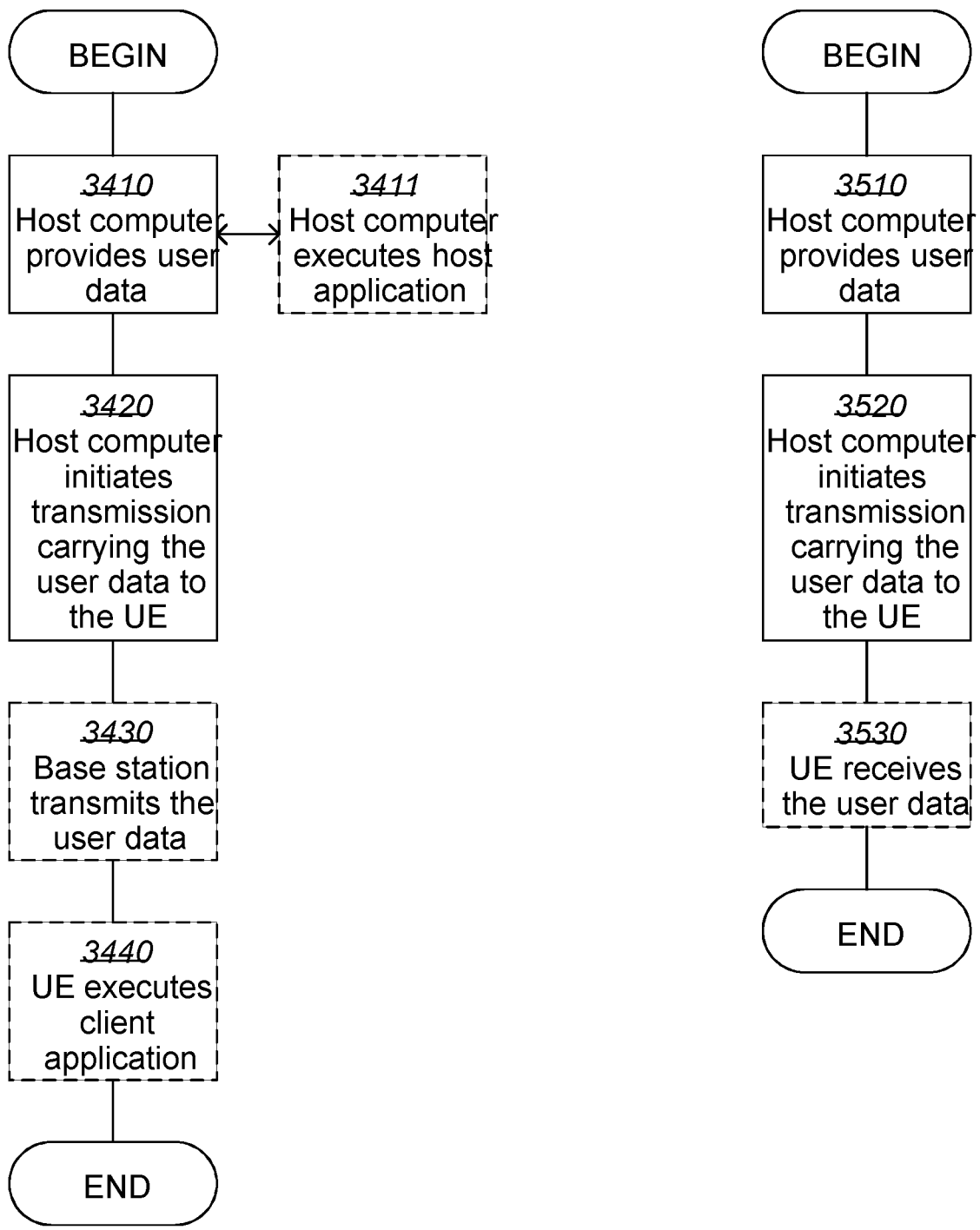

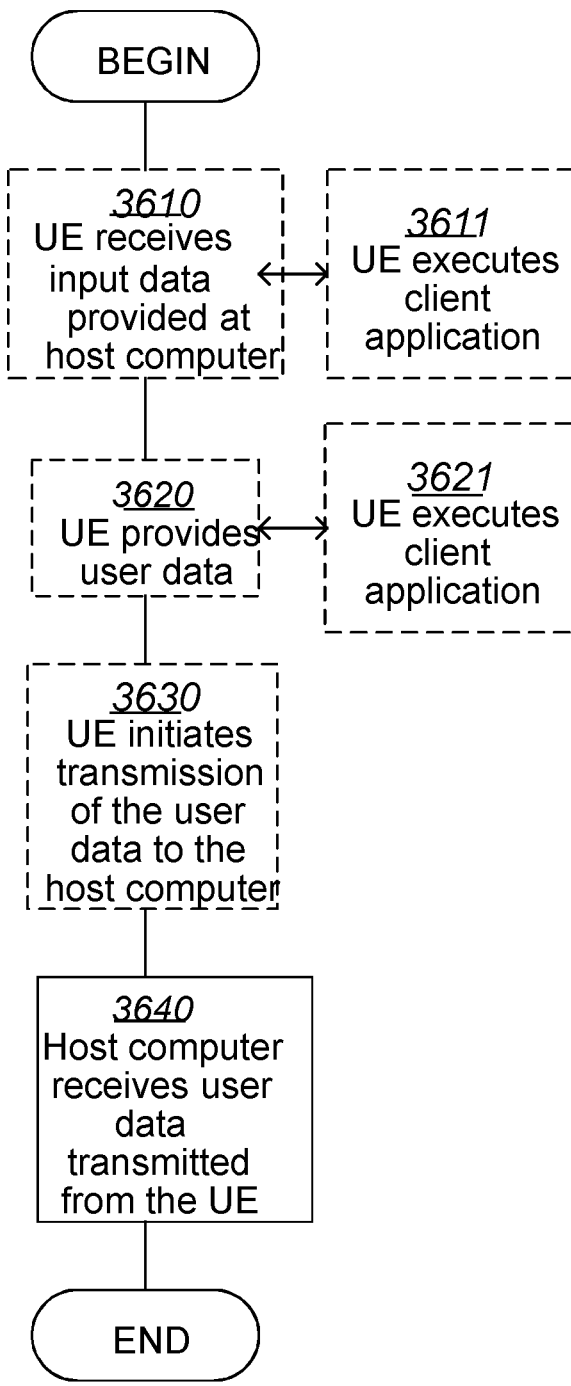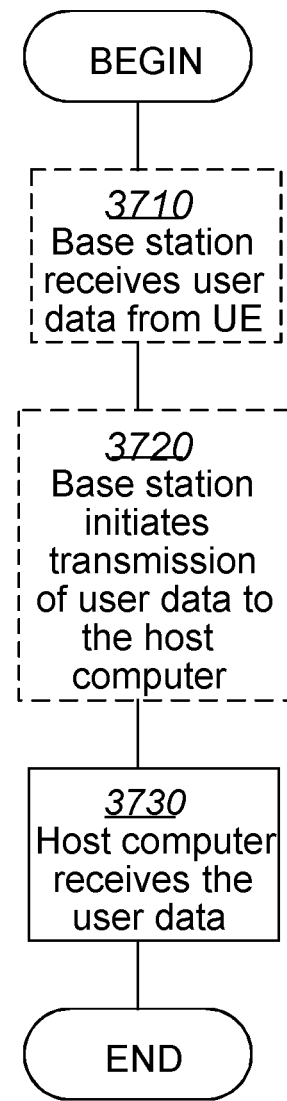
FIG. 17
FIG. 18

METHOD AND NETWORK NODE WITH IMPROVED BEAMFORMING

CROSS-REFERENCE TO RELATED APPLICATION

This application is a Submission Under 35 U.S.C. § 371 for U.S. National Stage Patent Application of International Application Number: PCT/SE2019/050896, filed Sep. 20, 2019 entitled "METHOD AND NETWORK NODE WITH IMPROVED BEAMFORMING," the entirety of which is incorporated herein by reference.

TECHNICAL FIELD

Embodiments herein generally relate to a network node and a method therein. More specifically, they relate to configuring an antenna system of the network node.

BACKGROUND

In a typical wireless communication network, wireless devices, also known as wireless communication devices, mobile stations, stations (STA) and/or User Equipments (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a W-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

A radio stripe system is an implementation of distributed, a.k.a. cell-free, massive MIMO where small access points are placed on a stripe, with all electronics and fronthaul integrated into that stripe. The radio stripe system facilitates a flexible and cheap cell-free Massive MIMO deployment.

FIG. 1 depicts an example radio stripe system wherein CPU=central processing unit, APU=antenna processing unit, DSP=digital signal processor, A/D=analog to digital converter, D/A=digital to analog converter, I=in-phase signal component, Q=quadrature phase signal component.

Antennas and the associated antenna processing units (APUs) may be serially located inside the same cable, which also provides synchronization, data transfer, and power supply via a shared bus. Specifically, the actual APUs comprise antenna elements and circuit-mounted chips, including power amplifiers, phase shifters, filters, modulators, A/D and D/A converters, inside a protective casing of a cable or a stripe. Each radio stripe is then connected to one or multiple CPUs. Since the total number of distributed antennas is assumed to be large, the transmit power of each antenna may be very low, resulting in low heat-dissipation, small volume and weight, and low cost. Small low-gain antennas are used. For example, if a carrier frequency is 5.2 GHz then the antenna size is 2.8 cm, thus, the antennas and processing hardware may be easily fitted in a cable/stripe.

The receive and/or transmit processing of an antenna is performed right next to itself.

On the transmitter side, each APU receives multiple streams of input data, e.g., one stream per UE, one UE with multiple streams, or some other UE-stream allocation, from the previous APU via the shared bus. In each antenna, the input data streams are scaled with the pre-calculated pre-coding vector and the sum-signal is transmitted over the radio channel to the receiver(s). By exploiting channel reciprocity, the precoding vector may be a function of the estimated uplink channels. If channel reciprocity holds, both the uplink and the downlink transmission links match exactly. In that case, the channel estimate of the uplink direction at the transmitter can directly be utilized e.g. for link adaptation in the downlink. Hence, channel reciprocity implies that the channel only needs to be characterized in one direction. For example, if the conjugate of the estimated uplink channel is used, Maximum ratio (MR) precoding is obtained. This precoding requires no Channel State Information (CSI) sharing between the antennas.

On the receiver side, the received radio signal is multiplied with the combining vector previously calculated in the uplink pilot phase. The output gives data streams that are then combined with the data streams received from the shared bus and sent again on the shared bus to the next APU.

A reference system architecture of a radio stripe system also referred to as a radio stick system, is depicted in FIG. 2, wherein stripe interfaces are referred as 200.

The Antenna Processing Units (APUs) are responsible for performing antenna pre-coding function in downlink and for performing antenna receive combination in uplink. They may also be responsible for calculation of local beamforming related parameters, e.g. downlink pre-coding and uplink combining weights, uplink and downlink power control parameters.

A Central Processing Unit (CPU) is among other things responsible for physical layer functions not performed in the APUs such as e.g. modulation/demodulation, channel encoding/de-coding, scheduling, etc., as well as calculation of global beamforming related parameters. The CPU is also responsible for overall coordination of the system operation such as determining APU and UE associations, etc. In case a UE is handed over to another CPU or in case the transmission and/or reception is to be coordinated through another CPU the controlling CPU for said UE is also responsible for coordinating and executing those functions.

The APU typically comprises, or is connected to, a small number of antenna elements, e.g. a handful, or less. Because phase synchronization among the Radio Frequency (RF) chains in an access point is difficult to achieve with low-cost hardware, a Butler matrix, RF lens or similar arrangement is often used in between the RF chains and the actual antennas, in order to create a set of fixed beams that point into pre-determined directions, see FIG. 3.

FIG. 3 illustrates a segment of a radio stripe depicting two APUs, each utilizing a similar grid of beams (GoB) generated by e.g. a Butler matrix, referred to as Butler in FIG. 3.

Since each APU has access to only a small number of antennas, the beam-space resolution is low and it may happen with substantial probability that a UE is located in between of two beams, leading to a low array gain or even a null.

SUMMARY

An object of embodiments herein is to improve the performance of an antenna system in a wireless communications network.

According to a first aspect of embodiments herein, the object is achieved by a method performed by a network node for configuring an antenna system of the network node. The antenna system comprises at least a first antenna processing unit, APU1, and a second antenna processing unit, APU2, adjacently connected to each other through a serialized front haul. Each one of the APU1 and APU2 comprises at least two antenna elements. The antenna elements of APU1 are connected to their respective Radio Frequency, RF, chains via a first beamforming unit, and the antenna elements of APU2 are connected to their respective RF chains via a second beamforming unit.

The network node configures the first beamforming unit and the second beamforming unit such that an absolute value of an angular difference between at least one of the beam directions generated by the first beamforming unit and each of the beam directions generated by the second beamforming unit exceeds or is equal to a threshold value.

According to another aspect of embodiments herein, the object is achieved by a network node for configuring an antenna system 20 of the network node. The antenna system comprises at least a first antenna processing unit, APU1, and a second antenna processing unit, APU2, adjacently connectable to each other through a serialised front haul. Each one of the APU1 and APU2 comprises at least two antenna elements. The antenna elements of APU1 are connectable to their respective Radio Frequency, RF, chains via a first beamforming unit, and the antenna elements of APU2 are connectable to their respective RF chains via a second beamforming unit. The network node is adapted to configure the first beamforming unit and the second beamforming unit such that an absolute value of an angular difference between at least one of the beam directions generated by the first beamforming unit and each of the beam directions generated by the second beamforming unit exceeds or is equal to a threshold value.

Thanks to that the network node configures the first beamforming unit and the second beamforming unit such that an absolute value of an angular difference between at least one of the beam directions generated by the first beamforming unit and each of the beam directions generated by the second beamforming unit exceeds or is equal to a threshold value, a higher likelihood that a UE is located in a beam with high gain from at least one APU is provided.

BRIEF DESCRIPTION OF THE DRAWINGS

Examples of embodiments herein are described in more detail with reference to attached drawings in which:

FIG. 9 is a flowchart depicting embodiments of a method in a network node.
FIGS. 15-18 are flowcharts illustrating methods implemented in a communication system including a host computer, a base station and a user equipment.

DETAILED DESCRIPTION

As a part of developing embodiments herein the inventors identified a problem which first will be discussed.

As mentioned above, an APU typically consist of, or is connected to, a small number of antenna elements. Because phase synchronization among the RF chains in an access point is difficult to achieve with low-cost hardware, a Butler matrix or similar arrangement is often used in between the RF chains and the actual antennas, in order to create a set of fixed beams that point into pre-determined directions according to prior art, see FIG. 3 again.

Since each APU has access to only a small number of antennas, the beam-space resolution is low and it may happen with substantial probability that a terminal is located in between of two beams, leading to a low array gain or even a null.

Figure 3:
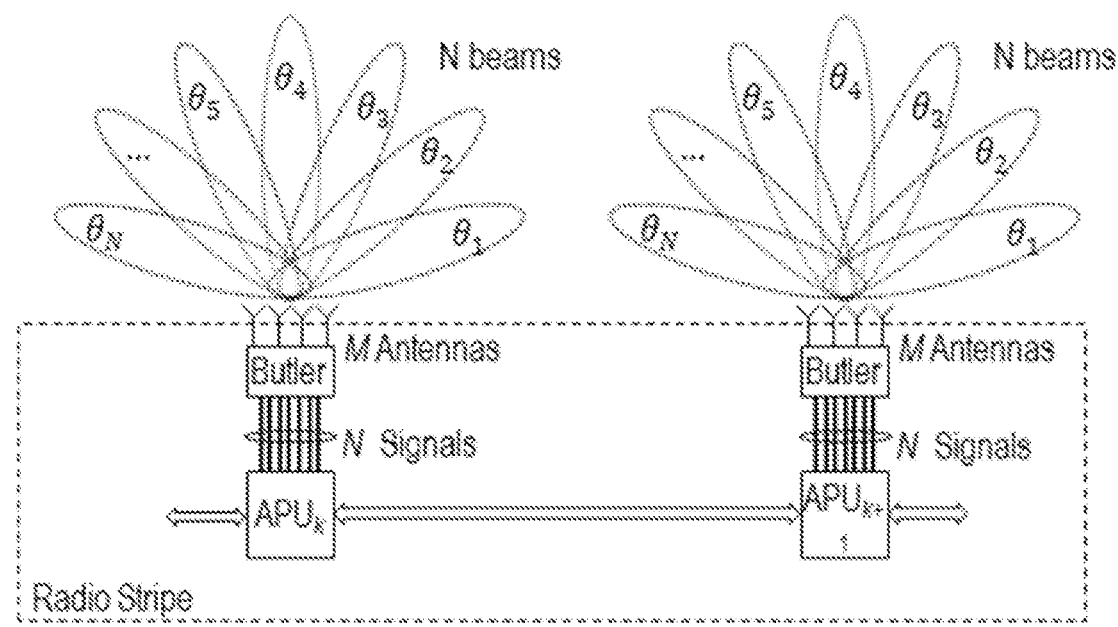
FIG. 3 is a schematic block diagram illustrating prior art.

In more detail, butler matrices, also referred to as phase shifter networks, may be used to achieve directional beamforming without requirements on phase-coherency between the RF branches. FIG. 3 depicts an example of a radio stripe according to Prior art, where the antennas at each access point are connected via an N×M Butler matrix with N beams/input signals and M antenna elements.

If the APU can achieve perfect phase coherency between its RF chains, and N≥M, then performance is theoretically the same as without the Butler matrix. But in general, phase coherency may not be assumed in-between APUs, and it is also possible that N<M. Also, there may be no phase coherency between radio stripe segments or between radio stripes connected to different CPUs.

Figure 1:
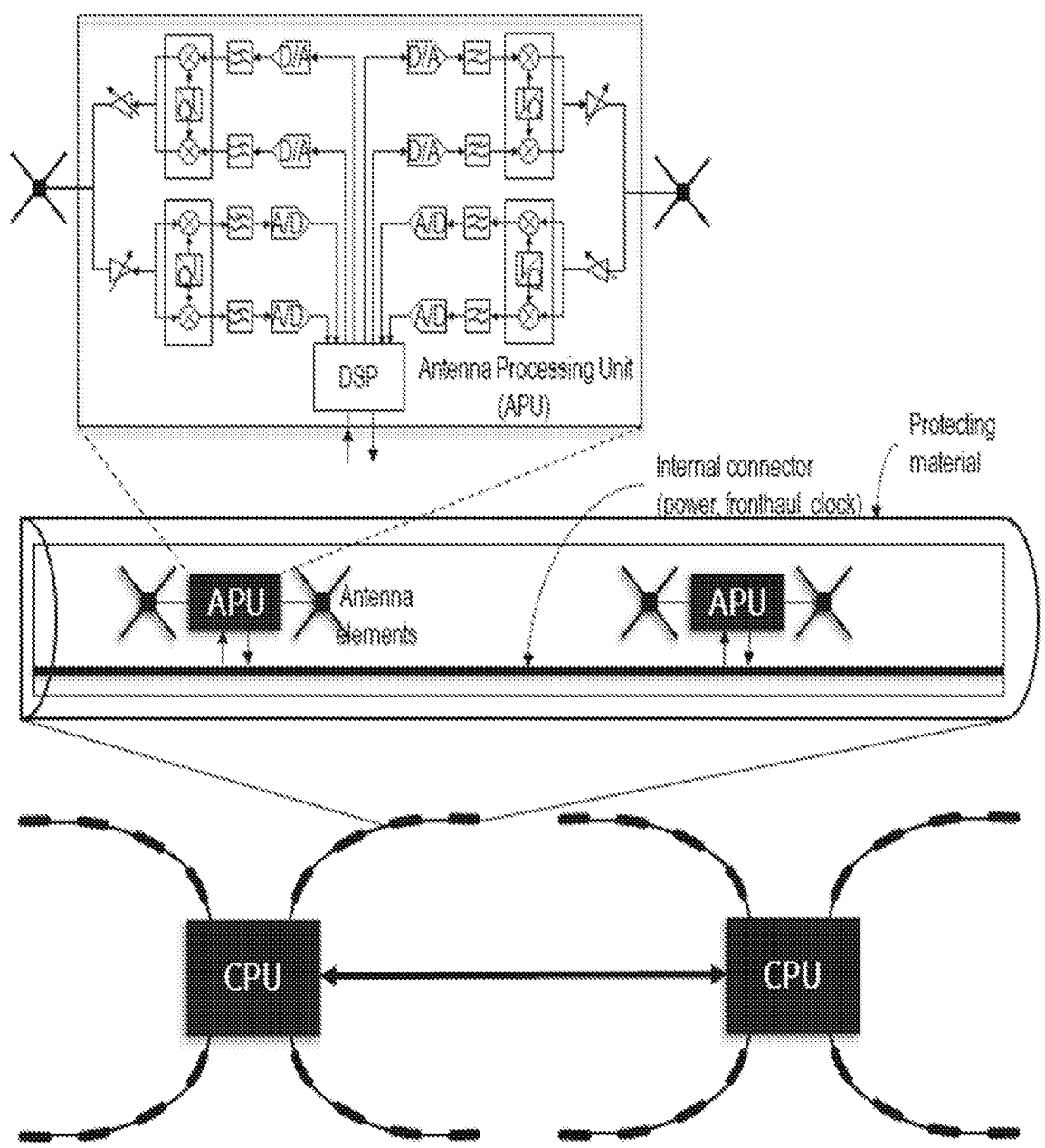
FIG. 1 is a schematic block diagram illustrating prior art.
Figure 2:
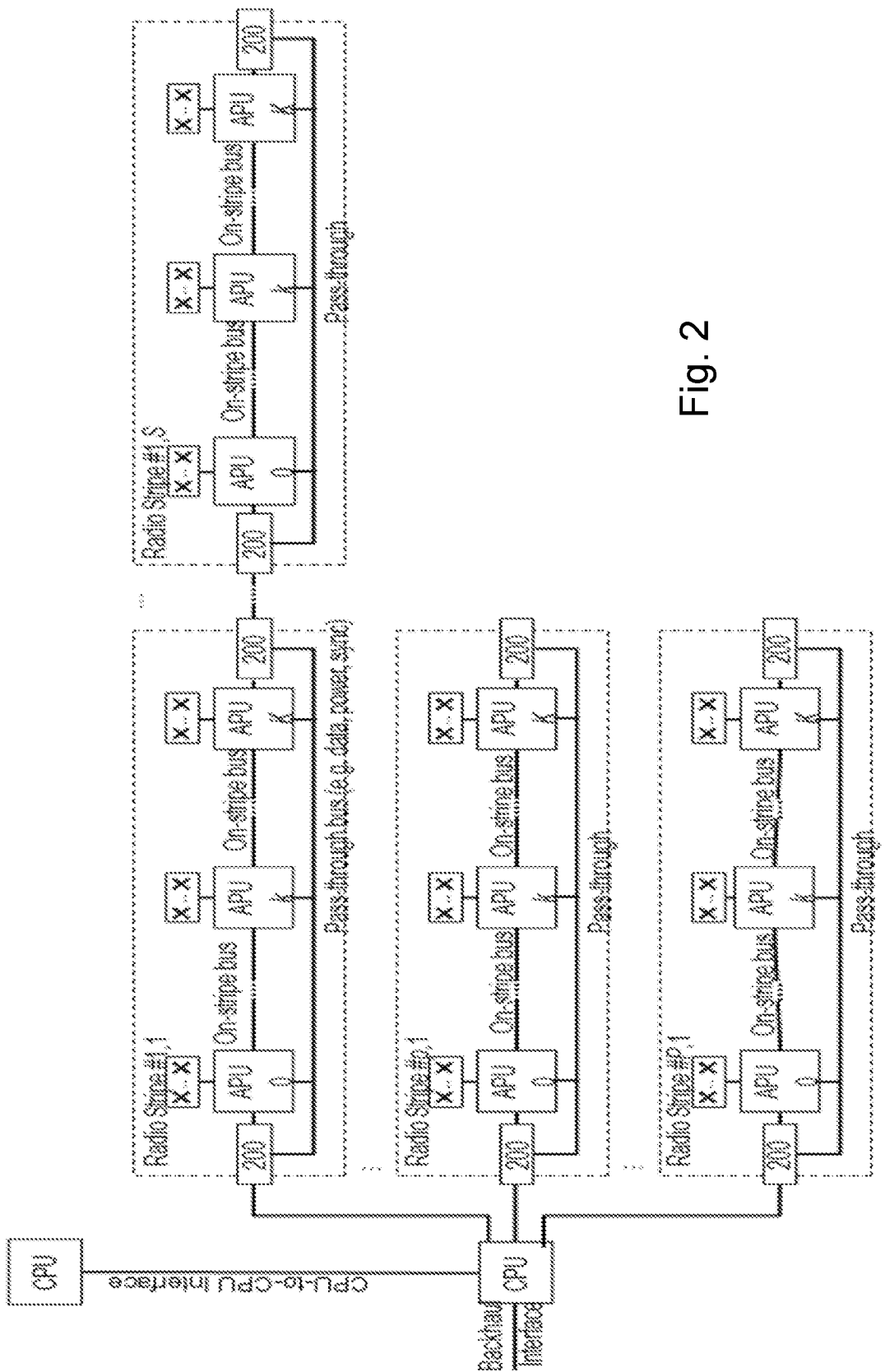
FIG. 2 is a schematic block diagram illustrating prior art.

In the canonical configuration, every beam of the Butler matrix is associated with an angle, $\theta_n$. Canonical configuration when used herein means the most standard or normal configuration used in practice. The Butler matrix is characterized by the angles of its N beams, $\theta_1, \ldots, \theta_N$, see FIG. 3. But in principle, depending on the exact antenna arrangement, which does not have to be with uniform spacing, and on the specifics of the Butler matrix, the beams may not be as "clean" as FIG. 1 suggests and may contain grating lobes or side lobes. Grating lobes when used refer to side lobes that have the same gain as the main lobes, but they are unintended and can create interference with the main lobe.

A problem with this arrangement is that in line-of-sight environments, foreseen as typical case for radio stripe deployments, and UEs in the geometric far-field of the stripe, a given UE will fall into and out of the same beam at every APU. Hence, a very high spatial resolution, i.e. many beams, per access point is required to be able to beamform with high precision to UEs far away.

Figure 4:
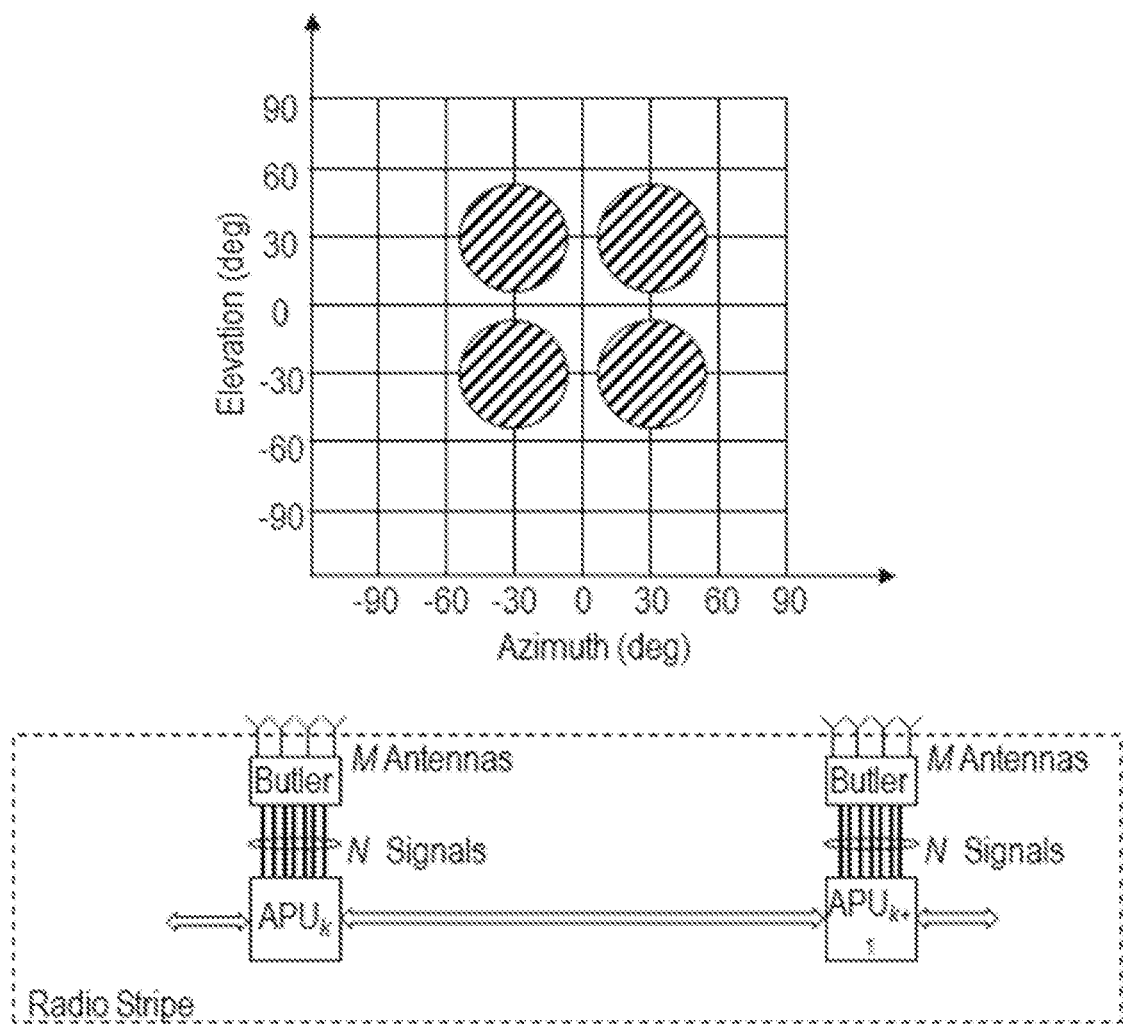
FIG. 4 is a schematic block diagram illustrating prior art.

Note that although FIG. 3 only depicts beams that differ in angles in one dimension, the same reasoning applies in case the beamforming operation is performed in e.g. two dimensions, i.e. vertical dimension also referred to as elevation and horizontal dimension also referred to as azimuth, see FIG. 4. FIG. 4 illustrates an example of beamforming in a two-dimensional planar array according to prior art. Beams generated by e.g. a Butler matrix may be described as using the elevation-azimuth diagram on top. The bottom part of the figure depicts a segment of a radio stripe containing two APUs using the same beam patters.

Figure 5:
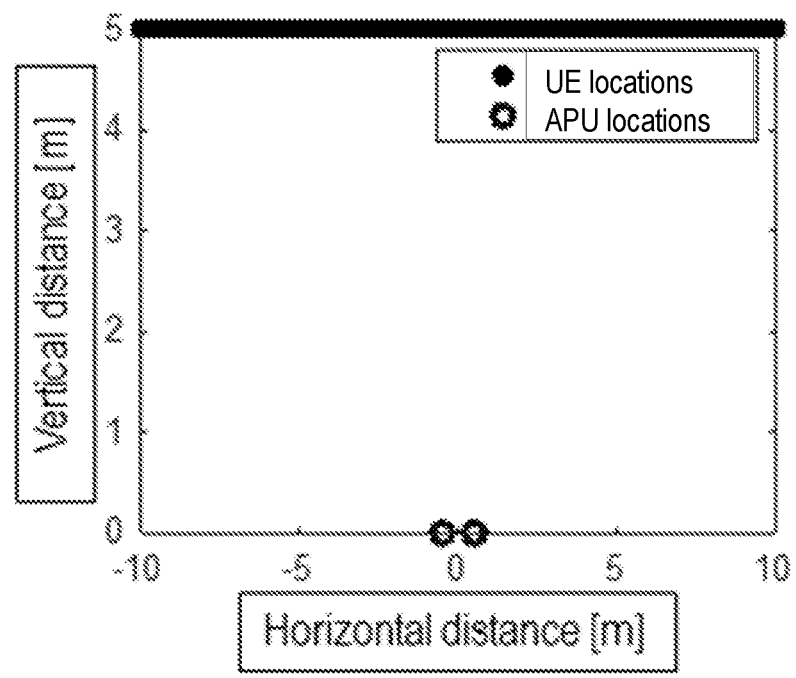
FIG. 5 is a schematic block diagram illustrating prior art.

FIG. 5: depicts an example deployment of UEs and access points. An AP is an APU plus an antenna array. According to the example relating to FIG. 5, a setup is considered where two APUs, are deployed at a wall and located at a 1-meter distance from each other. Each APU utilizes an antenna arrangement with M=4 antenna elements, in the shape of a horizontal uniform linear array with half-wavelength antenna spacing, and may generate N=4 predefined beams using a Butler matrix (or an RF lens array). Consider free-space line-of-sight channel models and that the carrier frequency is 3 GHz, corresponding to a wavelength of 0.1 m.

Further, consider a range of different UE locations, as shown in FIG. 5. All the UE positions are 5 m from the APUs in the vertical direction, while the horizontal location varies from −10 m to +10 m.

Figure 6A:
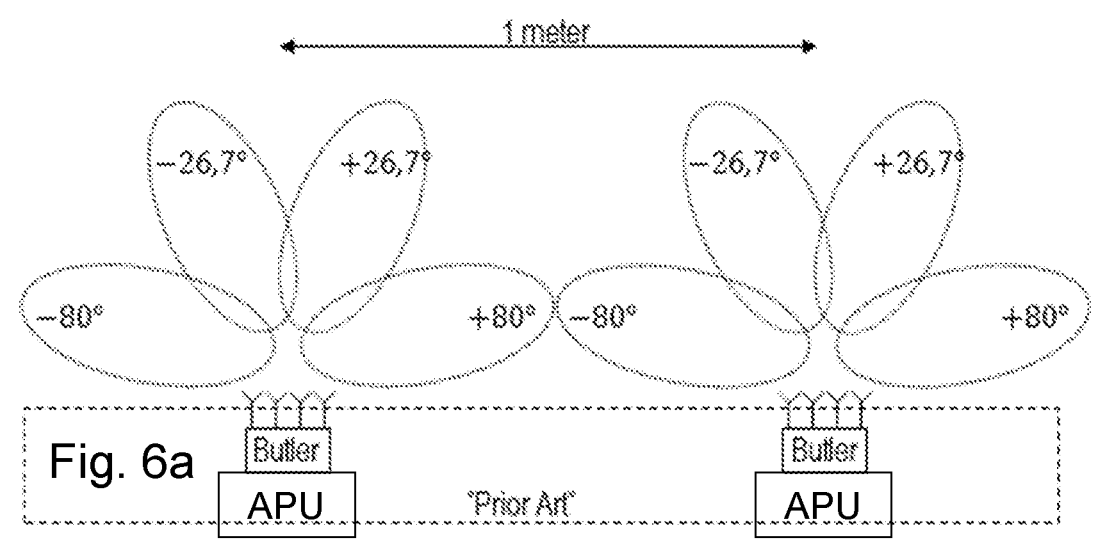
FIG. 6a is a schematic block diagram illustrating prior art.
Figure 6B:
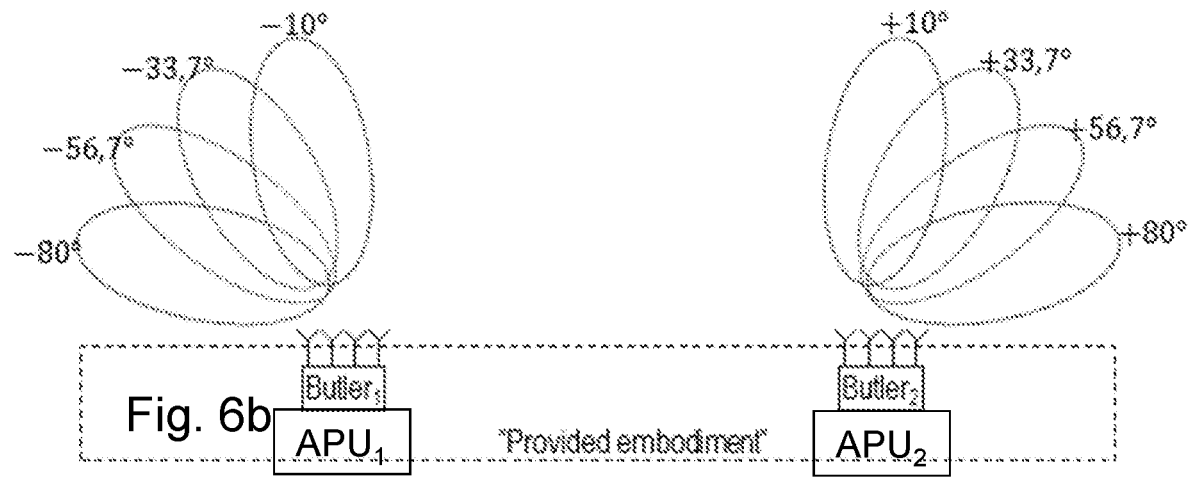
FIG. 6b is a schematic block diagram illustrating an embodiment herein

FIG. 6a depicts an example configurations in prior art (top) and FIG. 6b depicts an example of an embodiment provided herein.

FIG. 6a depicts a conventional approach according to prior art is to use identical Butler matrices on the two APUs. In this example, the four beams are selected to point in the equally spaced angular directions −80 degrees (deg), −26.7 deg, +26.7 deg, and +80 deg. These are selected to cover the entire range from −90 to +90 degrees.

According to examples embodiments provided herein, Butler matrices of each APU are configured such that they generate beam patterns that are different between different access points. This is an advantage since in this way a higher likelihood that a UE is located in a beam with high gain from at least one APU is provided.

An example of such arrangement according to embodiments herein, is depicted in FIG. 6b. In the provided embodiment example, the Butler matrix of the left $APU_1$ is instead configured to send beams in the angular directions −80 deg, −56.7 deg, −33.3 deg, −10 deg, while the right $APU_2$ is configured to send beams in the angular directions 10 deg, 33.3 deg, 56.7 deg, 80 deg. Hence, in the provided embodiment example, the APUs are concentrating their beams into the left and right halfplane, respectively.

Figure 7:
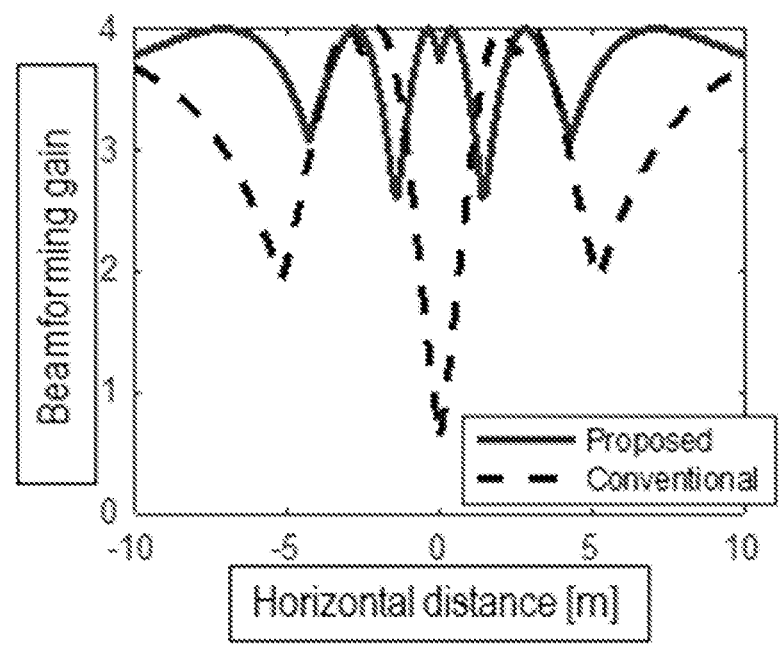
FIG. 7 is a schematic diagram illustrating an embodiment herein compared to prior art.

The benefit of the provided embodiment example this is shown in FIG. 7. The beamforming gain is shown for different UE locations, assuming that the system only uses the best of the 8 predefined beams, 4 per APU.

The problem with the conventional approach according to prior art, referred to as a dashed curve in FIG. 7, is that the UE sometimes falls in between all the beams from both APUs; for example, this happens in this example when the UE is at the horizontal location of 0 m, in which case the beamforming gain is below one, so an omnidirectional antenna would have been preferred.

In contrast, the configuration provided by embodiments herein, referred to as a solid curve in FIG. 7, gives a high beamforming gain of between 2.5 to 4 in the entire range of user locations. This is because the beams are jointly selected for the APUs to provide good coverage in all angular directions.

Some embodiments herein relate to Distributed MIMO, cell-free Massive MIMO, radio stripes, and/or spatial multiplexing.

Figure 8A:
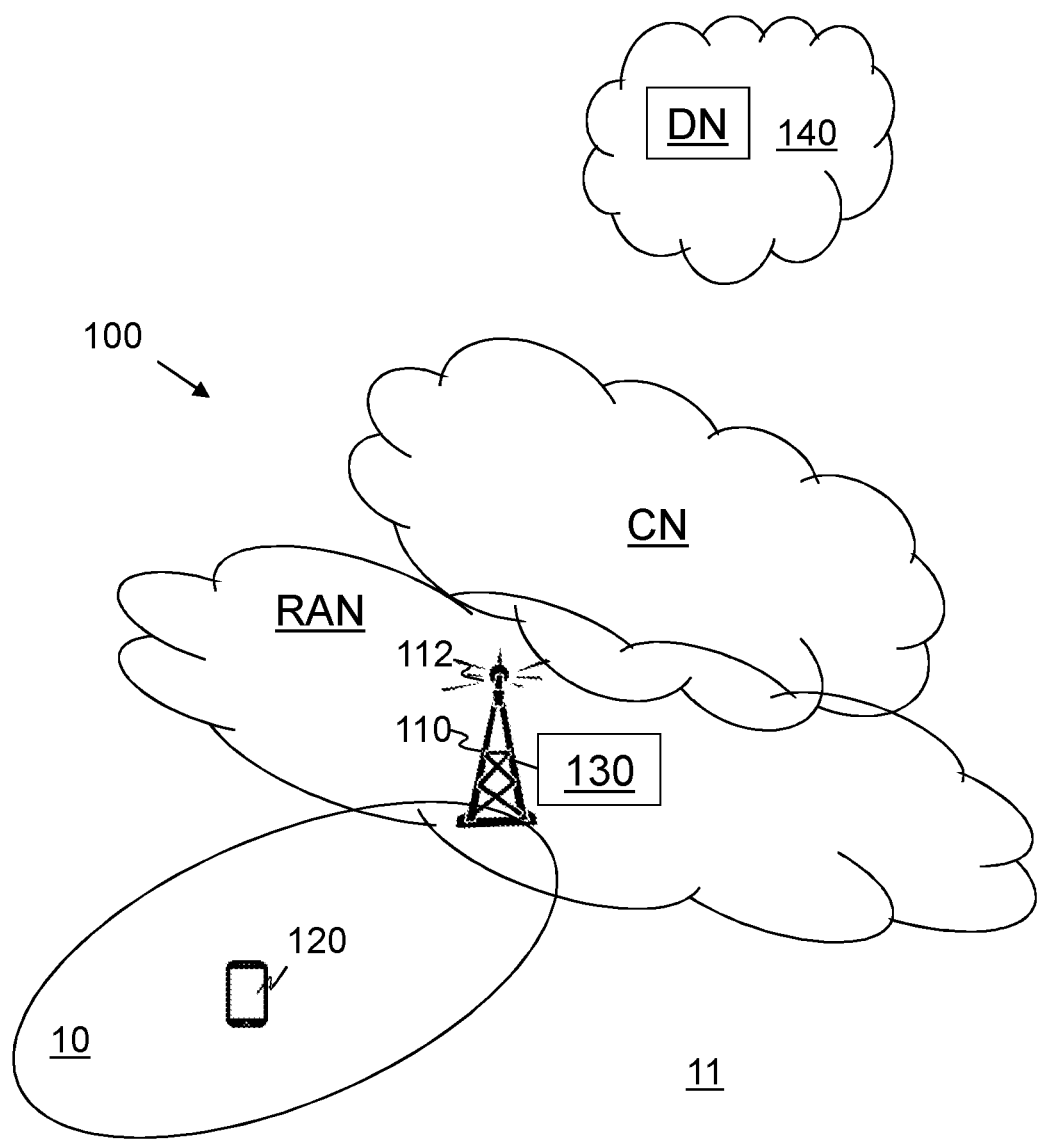
FIG. 8 a and b are schematic block diagrams illustrating embodiments of a wireless communications network.

FIG. 8a is a schematic overview depicting a wireless communications network 100 wherein embodiments herein may be implemented. The wireless communications network 100 comprises one or more RANs and one or more CNs. The wireless communications network 100 may use a number of different technologies, such as Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Network nodes operate in the wireless communications network 100 such as a network node 110 providing radio coverage over a respective geographical area, a service area 10, which may also be referred to as a beam or a beam group. The network node 110 may be an NG-RAN node, transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with UEs within the service area served by the network node 110 depending on the radio access technology and terminology used. The network node 110 may communicate with a UE 120 with Downlink (DL) transmissions to the UE 120 and Uplink (UL) transmissions from the UE 120.

Figure 8B:
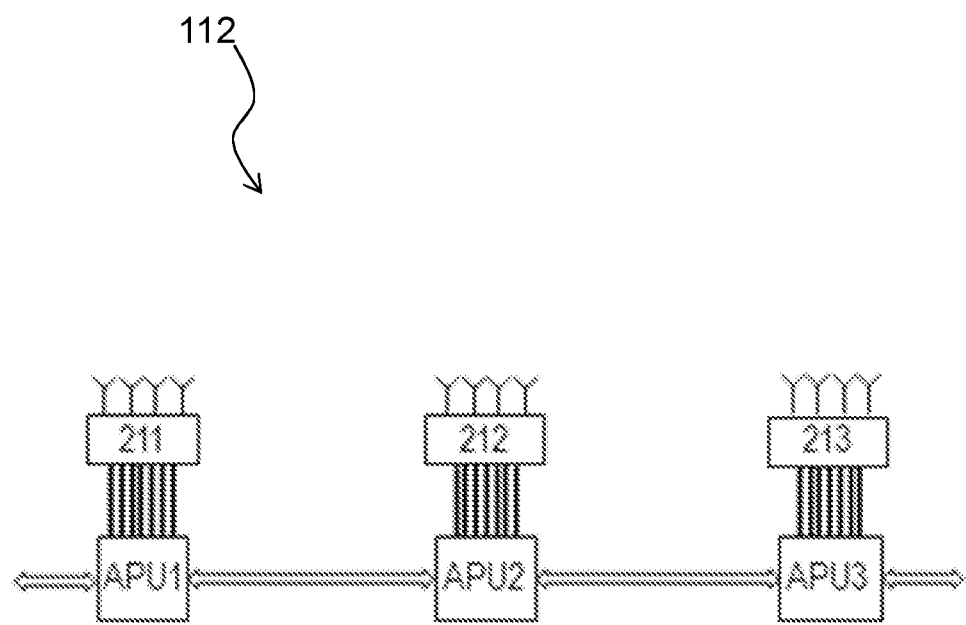

The network node 110 comprises an antenna system 112 shown more in detail in FIG. 8b. The antenna system 112 comprises at least a first antenna processing unit (APU1) and a second antenna processing unit (APU2), adjacently connected to each other through a serialised front haul. A serialised fronthaul when used herein means that several APUs, at least two, are communicating with a Central Processing Unit (CPU) through the same physical cable. This contrasts with a parallelized fronthaul where each APU uses separate physical fronthaul cables.

Each one of the APU1 and APU2 comprises at least two antenna elements. The antenna elements of APU1 are connected to their respective Radio Frequency, RF, chains via a first beamforming unit 211, and the antenna elements of APU2 are connected to their respective RF chains via a second beamforming unit 212.

In some embodiments, the antenna system 112 further comprises one or more third access points (APU3s) adjacently connected to the each other and the APU1, and APU2, through a serialised front haul. Only one APU3 is shown in FIG. 8b. Each one of the one or more APU3s comprises at least two antenna elements. The antenna elements of the respective one or more APU3s are connected to their respective Radio Frequency, RF, chains via a respective third beamforming unit 213.

The antenna system 112 may in some embodiments comprise a radio stripe 113 not shown in FIG. 8b, but shown in FIG. 10 described below, comprising any one out of: The at least APU1 and APU2, or the APU1, the APU2, and the one or more APU3s.

The wireless communications network 100 may comprise or be connected to a central unit 130 which according to embodiments herein e.g. is used for selecting an APU that is configured with a suitable a beam direction for serving the UE 120, which will be described below. The central unit 130 is comprised in the antenna system 112 and is e.g. connected to the radio stripe 113. The central unit 130 may e.g. be a CPU.

Wireless devices operate in the wireless communication network 100, e.g. the UE 120 depicted in FIG. 8a which e.g. may be a mobile station, a non-access point (non-AP) STA, a STA, a user equipment and/or a wireless terminals, communicate via one or more Access Networks (AN), e.g. RAN, to one or more core networks (CN).

It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell.

Methods herein may be performed by the network node 110. As an alternative, a Distributed Node (DN) and functionality, e.g. comprised in a cloud 140 as shown in FIG. 8a, may be used for performing or partly performing the methods.

The above described problem is addressed in a number of embodiments, some of which should be seen as alternatives, while some may be used in combination.

Example embodiments of a method performed by a network node 110 for configuring an antenna system 112 of the network node 110 will now be described with reference to a flowchart depicted in FIG. 9. As mentioned above, the antenna system 112 comprises at least a first antenna processing unit (APU1) and a second antenna processing unit (APU2), adjacently connected to each other through a serialised front haul. Each one of the APU1 and APU2 comprises at least two antenna elements. The antenna elements of APU1 are connected to their respective RF chains via the first beamforming unit 211, and the antenna elements of APU2 are connected to their respective RF chains via the second beamforming unit 212.

In some embodiments, the antenna system 112 further comprises the one or more third access points (APU3s) adjacently connected to the each other and the APU1, and APU2, through a serialised front haul. Each one of the one or more APU3s comprises at least two antenna elements. The antenna elements of the respective one or more APU3s are connected to their respective RF chains via the respective third beamforming unit 213.

The antenna system 112 may in some embodiments comprise a radio stripe 113 comprising any one out of: The at least APU1 and APU2, or the APU1, the APU2, and the one or more APU3s.

Any of one or more out of the first beamforming unit 211, the second beamforming unit 212 and one or more third beamforming units 213 may e.g. be represented by a respective Butler matrix or a respective RF lens. This means that the beamforming units e.g. may be a respective Butler matrix or a respective RF lens.

The method may comprise one or more of the following actions which actions may be taken in any suitable order.

Action 901

According to embodiments herein, the beamforming units 211, 212 such as e.g. Butler matrices or RF lenses, of each APU are configured such that they generate beam patterns that are different between different APUs. This is an advantage since in this way there is a higher likelihood that UEs will be served by means of the antenna system 112 such as the UE 120 are located in a beam with high gain from at least one APU.

Thus, the network node 110 configures the first beamforming unit 211 and the second beamforming unit 212. This is according to embodiments performed such that an absolute value, e.g. a minimum absolute value, of an angular difference between at least one of the beam directions generated by the first beamforming unit 211 and each of the beam directions generated by the second beamforming unit 212 exceeds or is equal to a threshold value. This means that beams generated by different beam forming units, such as different Butler matrices, will point in different directions. Thereby at least one beam pointing towards an intended UE, such as the UE 120, is more likely to be narrower and more likely to have a higher beamforming gain A beam direction when used herein means the pointing direction of the main lobe in 3D space. The beam direction thus characterized by both an azimuth and an elevation direction.

An absolute value when used herein means the magnitude of a real number without regard to its sign. A minimum absolute value when used herein may mean that every beam generated by the first beamforming unit is compared to every beam generated by the second beamforming unit and for every beam pair an absolute value of the beam pointing difference is calculated and the smallest such value is the minimum absolute value.

In some embodiments, the network node 110 further configures the one or more third beamforming units 213 such that an absolute value, e.g. minimum absolute value, of an angular difference between at least one of the beam directions generated by the third beamforming unit 213 and each of the beam directions generated by the respective first beamforming unit 211 and second beamforming unit 212 exceeds or is equal to a threshold value.

In some embodiments, the network node the configuring of the first beamforming unit 211, the second beamforming unit 212, and one or more third beamforming units 213 is performed such that the beam patterns of the set of beams of APU1, APU2, and one or more APU3s complement each other to achieve an angular radio coverage.

The network node 110 may then send information about the configured beamforming units of the APUs to the central unit 130 so that the central unit at a later stage can select an APU that provides a proper beam direction to serve a UE such as the UE 120.

Action 902

According to an example scenario, the UE 120 is to be served by the antenna system 112. The central unit 130 selects a suitable APU that provides a beam direction being closest to pointing to the UE 120, and sends information about the selected APU to the network node 110. E.g. the network node 110 may ask the UE 120 to send Pilot signals to be measured on by the network node 110. This pilot signal may be used to select the APU having the best suited beam to serve the UE 120. This information may be reported to the central unit 130 as a basis for selecting also referred to as deciding, a suitable APU.

Thus the network node 110 may obtain the information from the central unit 130. The information is about a selected APU. The APU is selected among the APU1, APU2, and possibly one or more APU3s as being the APU that is configured with a beam direction being closest to pointing to the UE 120.

In an example scenario, the network node 110 may generate beams in as many directions as possible that are as narrow as possible while still covering the hole area. Then the best beam is identified based on the pilot transmitted from the UE 120. This is done by measuring the received pilot strength in every beam and identifying the beam where the reference signal from the UE 120 is received with the greatest power.

Action 903

In some embodiments, the network node 110 then informs the selected APU about which beam to use for serving the UE 120. The network node 110 may send a command to the selected APU. The command commands the selected APU to serve the UE 120 using the beam direction being closest to pointing to the UE 120.

The method described above will now be further explained and exemplified.

Figure 10:
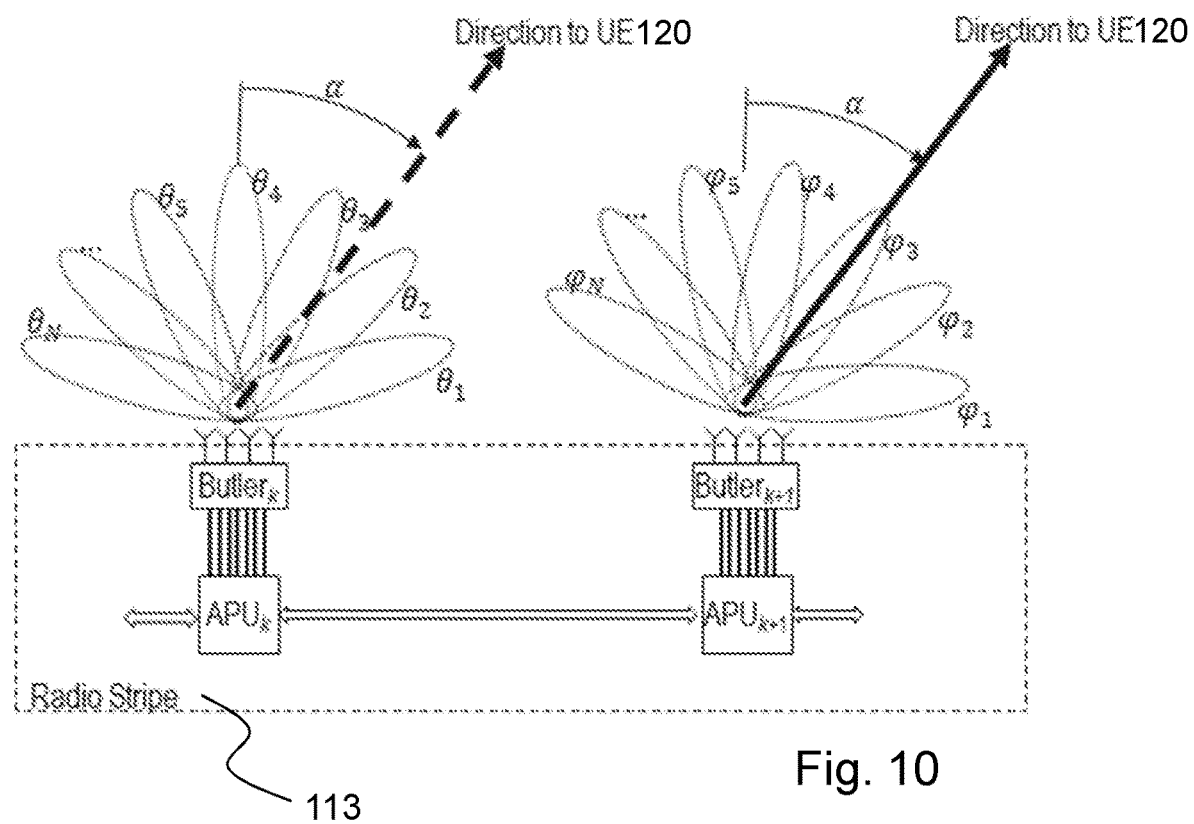
FIG. 10 is a schematic block diagram illustrating an embodiment herein.

FIG. 10 depicts an example embodiment with adjacent APUs utilizing different and complementary sets of beams, $\theta_1, \ldots, \theta_N$ and $\varphi_1, \ldots \varphi_N$ for $APU_k$ and $APU_{k+1}$, respectively. The beams $\theta$ and $\varphi$ each refer to different set of beams, therefore different names for the beams are used to indicate that.

The APU1 to the left in FIG. 10, is referred to as $APU_k$, (also known as access point 1) generates beams that point into angles $\theta_1, \ldots, \theta_N$, while the APU2 to the right in FIG. 10 is referred to as $APU_{k+1}$, (also known as access point 2) generates beams that point into the angles $\varphi_1, \ldots, \varphi_N$. In this example the first beamforming unit 211 is represented by a $Butler_k$ and the second beamforming unit 212 is represented by a $Butler_{k+1}$. The beam patterns of adjacent APU1 and APU2 are further arranged such that the set of beams in adjacent APU1 and APU2 complement each other to achieve a better angular coverage. This is exemplified by the two thick arrows in FIG. 11, indicating a direction towards a served UE such as the UE 120 (not shown in the figure). If the angle-of-departure (AoD) towards the UE 120 is denoted as α then it is seen in this example that none of the beams used by $APU_k$ ($\theta_1, \ldots, \theta_N$) matches this angle well, see dashed arrow. With a configuration comprising a simple modification of the beampattern of an adjacent $APU_{k+1}$, in this example a small shift in beam-pointing direction for all beams $\varphi_1, \ldots, \varphi_N$, it is ensured that at least one beam marked with a solid arrow, in the set $\theta_1, \ldots, \theta_N, \varphi_1, \ldots,$ $\varphi_N$ will have a large beamforming gain in the AoD direction α where the UE 120 is located.

Thus some embodiments herein provide a beam space diversity effect. The central unit 130 such as a CPU selects the APU that have a large beamforming gain in the AoD direction α where the UE 120 is located, in this example the APU2 represented by the $APU_{k+1}$. having a beam in with a beam direction $\varphi_3$ that is pointing in the direction α towards the UE 120. This information is obtained in the network node 110 which sends a command to the selected APU to instruct the selected APU2 to serve the UE 120 in the beam direction $\varphi_3$.

Thus, for the left antenna processing unit, $APU_k$, the Butler matrix is characterized by the angles of its N beams, $\theta_1, \ldots, \theta_N$. For the right antenna processing unit, $APU_{k+1}$, the corresponding angles are $\varphi_1, \ldots, \varphi_N$ and these angles are different from $\theta_1, \ldots, \theta_N$. Hence, it is more likely that at least one of the access points can serve any given UE with a beam that has an appropriate angle, i.e. beam direction.

Figure 11A:
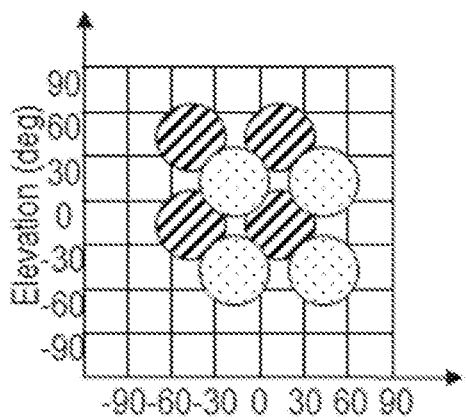
FIG. 11 a-e are schematic block diagrams illustrating embodiments herein.
Figure 11B:
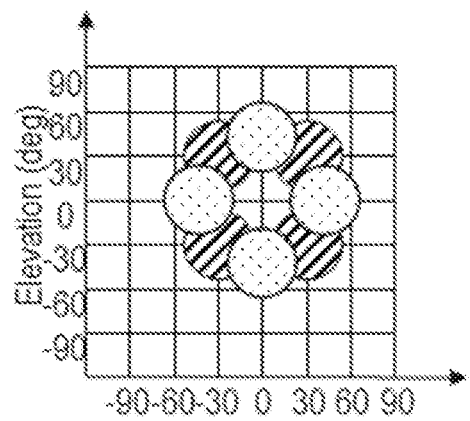
Figure 11C:
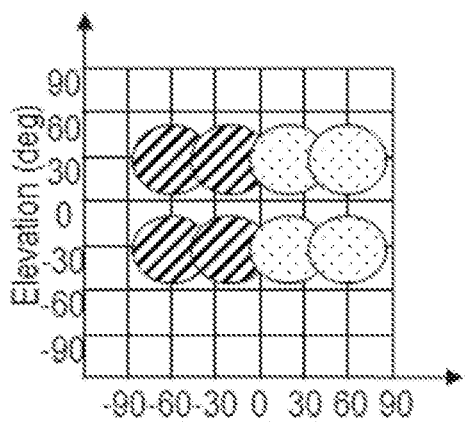
Figure 11D:
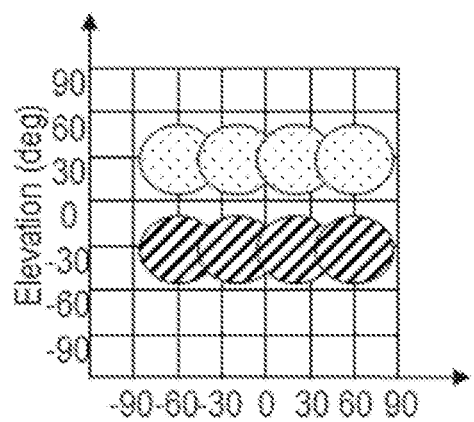
Figure 11E:
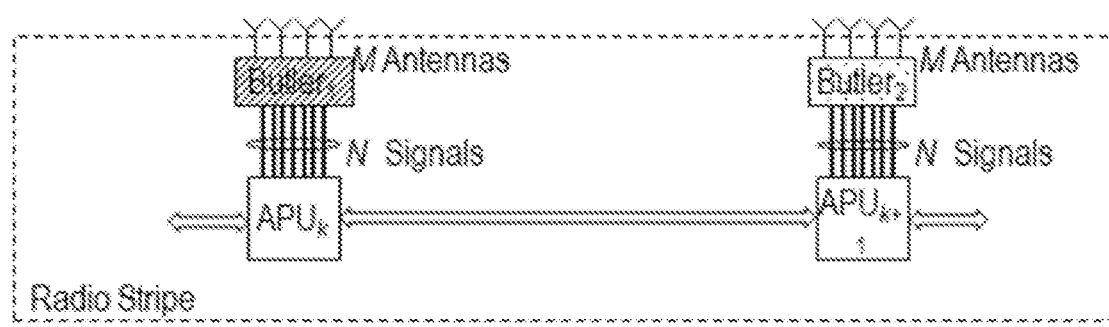

In FIGS. 11a-d depicts some typical examples of beam-pattern shifts used in adjacent APUs shown in FIG. 11e, such as the APU1, APU2. The FIGS. 11a-e depict some examples of beam direction configurations of the first beamforming unit 211, referred to as Butler 1 in FIG. 11e, and the second beamforming unit 212 referred to as Butler 2 in FIG. 11e, such as beam-pattern adjustments that may be utilized in in planar array antenna arrangements related to the antenna system 112.

In FIGS. 11a-d, the APU1 provides beam-pattern 1 which is represented by diagonal stripes and the APU2 provides beam-pattern 2 which is represented by dots.

FIG. 11a indicates an example where the first beamforming unit 211 of APU1 is configured to provides beam-pattern 1 is shifted −45 degrees in both azimuth and elevation directions, while the second beamforming unit 212 of APU2 is configured to provide beam-pattern 2 is shifted+45 degrees in both azimuth and elevation directions instead.

FIG. 11b indicates an example where the second beamforming unit 212 of APU2 is configured to provide beam-pattern 2 as being rotated 45 degrees in the azimuth-elevation plane relative to the beam-pattern 1 provided by the configured first beamforming unit 211.

FIG. 11c indicates an example where first beamforming unit 211 and the second beamforming unit 212 are configured to provide respective beam-patterns 1- and 2 shifted in azimuth only.

FIG. 11d indicates an example where first beamforming unit 211 and the second beamforming unit 212 are configured to provide respective beam-patterns 1- and 2 shifted in elevation only.

It should be noted that the examples in FIG. 11a-d are for an illustrative purpose only and they do not exemplify a list of all possible different sets of beam-patterns.

Note that although the example in FIG. 11 a-d only shows two different beam patterns being used in two adjacent APUs, APU1 and APU2, a larger group of different beam-pattern may also be used, like size 3, 4, . . . that are used in a larger group of APUs also comprising the one or more APU3s.

Figure 12A:
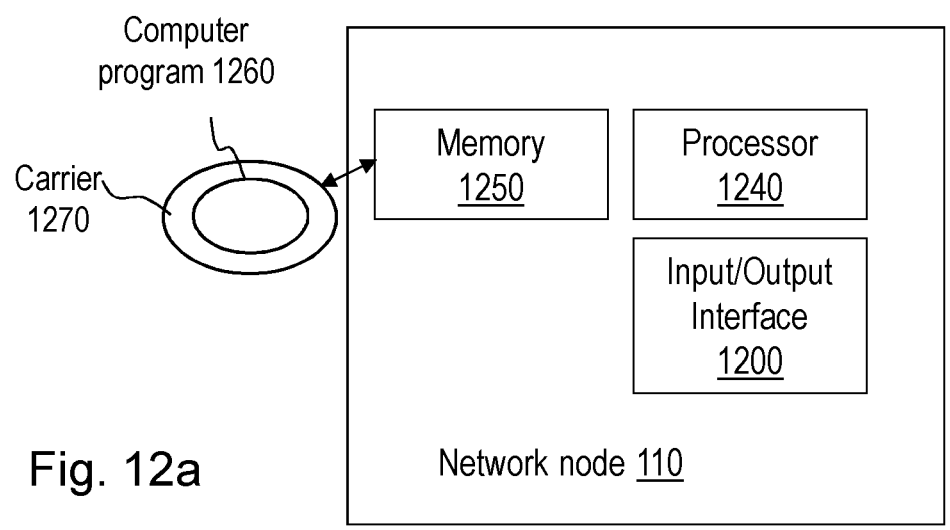
FIG. 12 a-b are schematic block diagrams illustrating an embodiment of a network node.
Figure 12B:
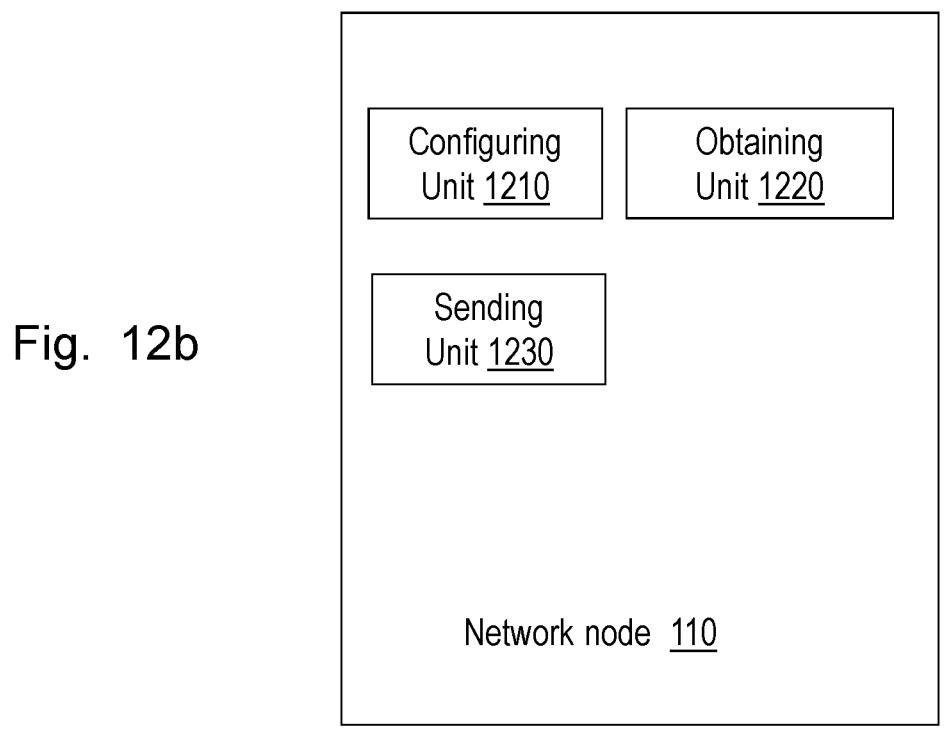

To perform the method actions above the network node 110 is arranged to configure an antenna system 112 of the network node 110, and may comprise the arrangement depicted in FIGS. 12a and 12b. As mentioned above, the antenna system 112 comprises at least the first antenna processing unit, APU1, and the second antenna processing unit, APU2, adjacently connectable to each other through a serialised front haul. Each one of the APU1 and APU2 comprises at least two antenna elements. The antenna elements of APU1 are connectable to their respective RF chains via the first beamforming unit 211, and the antenna elements of APU2 are connectable to their respective RF chains via the second beamforming unit 212.

The network node 110 may comprise an input and output interface 1200 configured to communicate e.g. with the UE 120. The input and output interface 1200 may comprise a wireless receiver (not shown) and a wireless transmitter (not shown).

The network node 110 is adapted to, e.g. by means of a configuring unit 1210 in the network node 110, configure the first beamforming unit 211 and the second beamforming unit 212 such that an absolute value of an angular difference between at least one of the beam directions generated by the first beamforming unit 211 and each of the beam directions generated by the second beamforming unit 212 exceeds or is equal to a threshold value.

In some embodiments the antenna system 112 further comprises one or more third access points, APU3s, adjacently connected to the each other and the APU1, and APU2, through a serialised front haul. Each one of the one or more APU3s comprises at least two antenna elements. In these embodiments, the antenna elements of the respective one or more APU3s are connectable to their respective Radio Frequency, RF, chains via a respective third beamforming unit 213. In these embodiments, the network node 110 is further adapted to configure the one or more third beamforming units 213 such that absolute value of an angular difference between at least one of the beam directions generated by the third beamforming unit 213 and each of the beam directions generated by the respective first beamforming unit 211 and second beamforming unit 212 exceeds or is equal to a threshold value.

The antenna system 112 may be adapted to comprise a radio stripe 113 comprising any one out of: The at least APU1 and APU2, or the APU1, the APU2, and the one or more APU3s.

Any of one or more out of the first beamforming unit 211, the second beamforming unit 212 and one or more third beamforming units 213 are adapted to be represented by a respective Butler matrix or by a respective RF lens.

In some embodiments, the UE 120 is to be served by the antenna system 112.

In these embodiments, the network node 110 may further be adapted to e.g. by means of an obtaining unit 1220 in the network node 110, obtain from a central unit 130, information about a selected Antenna Processing Unit, APU. The APU is selected among the APU1, APU2, and possibly the one or more APU3s as being the APU that is configured with a beam direction being closest to pointing to the UE 120.

In these embodiments, the network node 110 may further be adapted to e.g. by means of an sending unit 1230 in the network node 110, send to the selected antenna processing unit, a command to serve the UE 120 with the selected antenna processing unit using the beam direction being closest to pointing to the UE 120.

The network node 110 may further adapted to configure of the first beamforming unit 211, the second beamforming unit 212, and one or more third beamforming units 213 by performing it such that the beam patterns of the set of beams of APU1, APU2, and one or more APU3s complement each other to achieve an angular radio coverage.

The embodiments herein may be implemented through a respective processor or one or more processors, such as the processor 1240 of a processing circuitry in the network node 110, depicted in FIG. 12a together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise a memory 1250 comprising one or more memory units. The memory comprises instructions executable by the processor in the network node 110. The memory 1250 is arranged to be used to store e.g. beam directions, information, data, configurations, and applications to perform the methods herein when being executed in the network node 110.

In some embodiments, a computer program 1260 comprises instructions, which when executed by the at least one processor, cause the at least one processor of the network node 110, to perform the actions above.

In some embodiments, a carrier 1270 comprises the computer program 1190, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the network node 110 described above may refer to a combination of analog and digital circuits, and/or one or more processors configured with software and/or firmware, e.g. stored in the network node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 13:
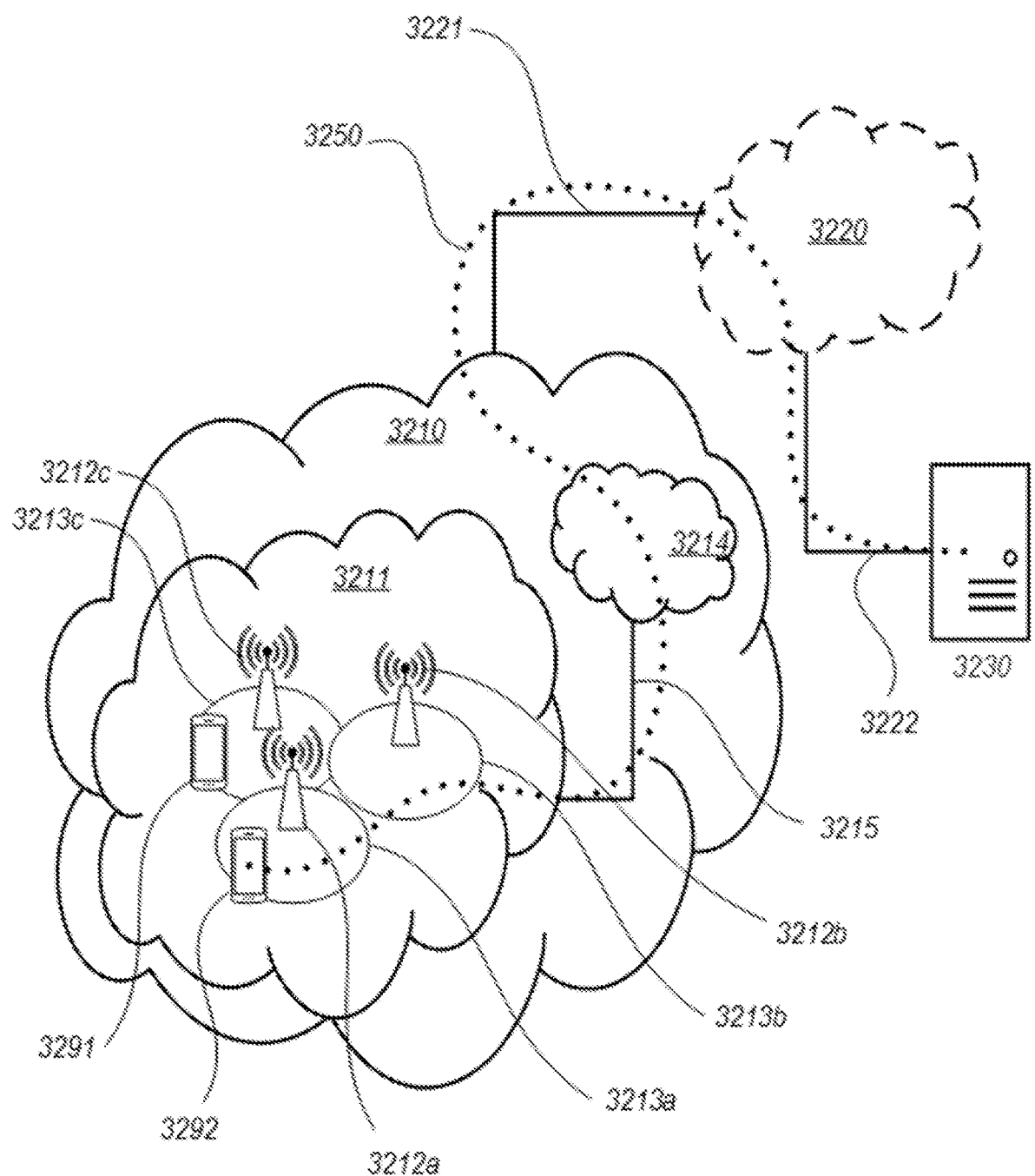
FIG. 13 schematically illustrates a telecommunication network connected via an intermediate network to a host computer.

With reference to FIG. 13, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 13 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 14. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 14) served by the base station 3320. The communication interface 3326 may be configured to facilitate a connection 3360 to the host computer 3310. The connection 3360 may be direct or it may pass through a core network (not shown in FIG. 14) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 14:
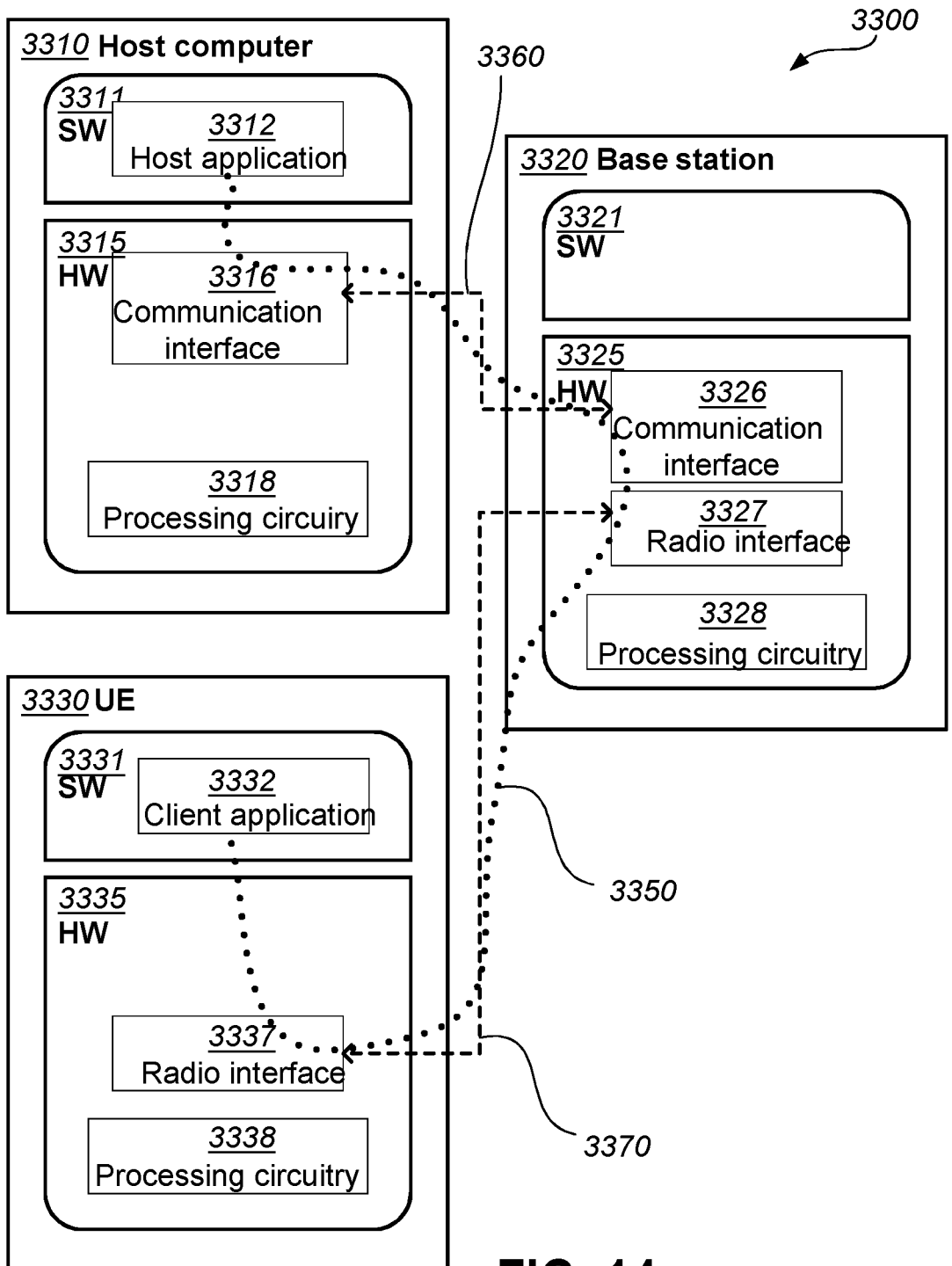
FIG. 14 is a generalized block diagram of a host computer communicating via a base station with a user equipment over a partially wireless connection.

It is noted that the host computer 3310, base station 3320 and UE 3330 illustrated in FIG. 14 may be identical to the host computer 3230, one of the base stations 3212a, 3212b, 3212c and one of the UEs 3291, 3292 of FIG. 13, respectively. This is to say, the inner workings of these entities may be as shown in FIG. 14 and independently, the surrounding network topology may be that of FIG. 13.

In FIG. 14, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. [If the radio-related invention has not yet been formulated at the time of drafting a provisional application, the expression "embodiments described throughout this disclosure" is meant to refer to the radio-related embodiments disclosed elsewhere in the application.] One or more of the various embodiments improve the performance of OTT services provided to the UE 3330 using the OTT connection 3350, in which the wireless connection 3370 forms the last segment.

More precisely, the teachings of these embodiments may improve the [select the applicable RAN effect: data rate, latency, power consumption] and thereby provide benefits such as [select the applicable corresponding effect on the OTT service: reduced user waiting time, relaxed restriction on file size, better responsiveness, extended battery lifetime].

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 15 is a flowchart illustrating a method implemented in a communication system, in accordance with one embodiment. The communication system includes a host computer, a base station such as an AP STA, and a UE such as a Non-AP STA which may be those described with reference to FIG. 13 and FIG. 14. For simplicity of the present disclosure, only drawing references to FIG. 15 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 16 is a flowchart illustrating a method implemented in a communication system, in accordance with one embodiment. The communication system includes a host computer, a base station such as an AP STA, and a UE such as a Non-AP STA which may be those described with reference to FIG. 13 and FIG. 14. For simplicity of the present disclosure, only drawing references to FIG. 16 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 17 is a flowchart illustrating a method implemented in a communication system, in accordance with one embodiment. The communication system includes a host computer, a base station such as an AP STA, and a UE such as a Non-AP STA which may be those described with reference to FIG. 13 and FIG. 14. For simplicity of the present disclosure, only drawing references to FIG. 17 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station such as an AP STA, and a UE such as a Non-AP STA which may be those described with reference to FIG. 13 and FIG. 14. For simplicity of the present disclosure, only drawing references to FIG. 18 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
| --- | --- |
| AP | Access point |
| APU | Antenna processing unit |
| CPU | Central processing unit |
| MIMO | Multiple input multiple output |
| DSP | Digital signal processing |
| GOB | Grid of beams |
| A/D | Analog to digital |
| D/A | Digital to analog |
| WMC | World mobile congress |
| MR | Maximum ratio |
| MMSE | Minimum mean square error |

The invention claimed is:

1. A method performed by a network node for configuring an antenna system of the network node, which antenna system comprises at least a first antenna processing unit, APU1, and a second antenna processing unit, APU2, adjacently connected to each other through a serialised front haul, and each one of the APU1 and APU2 comprising at least two antenna elements,
the antenna elements of APU1 being connected to their respective Radio Frequency, RF, chains via a first beamforming unit, and the antenna elements of APU2 being connected to their respective RF chains via a second beamforming unit, the method comprising:
configuring the first beamforming unit and the second beamforming unit such that an absolute value of an angular difference between at least one beam direction generated by the first beamforming unit and each beam direction generated by the second beamforming unit exceeds or is equal to a threshold value.

2. The method according to claim 1, wherein the antenna system further comprises one or more third access points, APU3s, adjacently connected to each other and the APU1, and APU2, through a serialised front haul, and wherein each one of the one or more APU3s comprises at least two antenna elements, wherein the antenna elements of the respective one or more APU3s are connected to their respective Radio Frequency, RF, chains via a respective third beamforming unit, and wherein the configuring further comprises:
configuring the one or more third beamforming units such that an absolute value of an angular difference between the at least one beam direction generated by the third beamforming unit and each beam direction generated by the respective first beamforming unit and second beamforming unit exceeds or is equal to a threshold value.

3. The method according to claim 2, wherein antenna system comprises a radio stripe comprising any one out of:
the at least APU1 and APU2; and
the APU1, the APU2, and the one or more APU3s.

4. The method according to claim 2, wherein any of one or more out of the first beamforming unit, the second beamforming unit and one or more third beamforming units are represented by a respective Butler matrix.

5. The method according to claim 2, wherein any of one or more out of the first beamforming unit, the second beamforming unit and one or more third beamforming units are represented by a respective RF lens.

6. The method according to claim 2, wherein a UE is to be served by the antenna system, the method further comprising:
obtaining from a central unit, information about a selected Antenna Processing Unit, APU, which APU is selected among the APU1, APU2, and one or more APU3s as being the APU that is configured with a beam direction being closest to pointing to the UE; and
sending to the selected antenna processing unit, a command to serve the UE with the selected antenna processing unit using the beam direction being closest to pointing to the UE.

7. The method according to claim 2, wherein the configuring of the first beamforming unit, the second beamforming unit, and one or more third beamforming units is performed such that the beam patterns of the set of beams of APU1, APU2, and one or more APU3s complement each other to achieve an angular radio coverage.

8. The method according to claim 1, wherein antenna system comprises a radio stripe comprising any one out of:
the at least APU1 and APU2; and
the APU1, the APU2, and the one or more APU3s.

9. The method according to claim 1, wherein any of one or more out of the first beamforming unit, the second beamforming unit and one or more third beamforming units are represented by a respective Butler matrix.

10. The method according to claim 1, wherein any of one or more out of the first beamforming unit, the second beamforming unit and one or more third beamforming units are represented by a respective RF lens.

11. The method according to claim 1, wherein a UE is to be served by the antenna system, the method further comprising:
obtaining from a central unit, information about a selected Antenna Processing Unit, APU, which APU is selected among the APU1, APU2, and one or more APU3s as being the APU that is configured with a beam direction being closest to pointing to the UE; and
sending to the selected antenna processing unit, a command to serve the UE with the selected antenna processing unit using the beam direction being closest to pointing to the UE.

12. The method according to claim 1, wherein the configuring of the first beamforming unit, the second beamforming unit, and one or more third beamforming units is performed such that the beam patterns of the set of beams of APU1, APU2, and one or more APU3s complement each other to achieve an angular radio coverage.

13. A non-transitory computer storage medium storing a computer program comprising instructions, which when executed by a processor, causes the processor to perform method for configuring an antenna system of a network node, which antenna system comprises at least a first antenna processing unit, APU1, and a second antenna processing unit, APU2, adjacently connected to each other through a serialised front haul, and each one of the APU1 and APU2 comprising at least two antenna elements, the antenna elements of APU1 being connected to their respective Radio Frequency, RF, chains via a first beamforming unit, and the antenna elements of APU2 being connected to their respective RF chains via a second beamforming unit, the method comprising:
configuring the first beamforming unit and the second beamforming unit such that an absolute value of an angular difference between at least one beam direction generated by the first beamforming unit and each beam direction generated by the second beamforming unit exceeds or is equal to a threshold value.

14. A network node for configuring an antenna system of the network node, which antenna system comprises at least a first antenna processing unit, APU1, and a second antenna processing unit, APU2, adjacently connectable to each other through a serialised front haul, and each one of the APU1 and APU2 comprising at least two antenna elements, the antenna elements of APU1 being connectable to their respective Radio Frequency, RF, chains via a first beamforming unit, and the antenna elements of APU2 being connectable to their respective RF chains via a second beamforming unit, the network node configured to:
configure the first beamforming unit and the second beamforming unit such that an absolute value of an angular difference between at least one beam direction generated by the first beamforming unit and each beam direction generated by the second beamforming unit exceeds or is equal to a threshold value.

15. The network node according to claim 14, wherein the antenna system further comprises one or more third access points, APU3s, configured to be adjacently connected to each other and the APU1, and APU2, through a serialised front haul, and wherein each one of the one or more APU3s comprises at least two antenna elements;
- wherein the antenna elements of the respective one or more APU3s are connectable to their respective Radio Frequency, RF, chains via a respective third beamforming unit; and
- wherein the network node is further configured to configure the one or more third beamforming units such that absolute value of an angular difference between at least one beam direction generated by the third beamforming unit and each beam direction generated by the respective first beamforming unit and second beamforming unit exceeds or is equal to a threshold value.

16. The network node according to claim 15, wherein antenna system is configured to comprise a radio stripe comprising any one out of:
- the at least APU1 and APU2; and
- the APU1, the APU2, and the one or more APU3s.

17. The network node according to claim 14, wherein any of one or more out of the first beamforming unit, the second beamforming unit and one or more third beamforming units are configured to be represented by a respective Butler matrix.

18. The network node according to claim 14, wherein any of one or more out of the first beamforming unit, the second beamforming unit and one or more third beamforming units are configured to be represented by a respective RF lens.

19. The network node according to claim 14, wherein a UE is to be served by the antenna system, and wherein the network node is further configured to:
- obtain from a central unit, information about a selected Antenna Processing Unit, APU, which APU is selected among the APU1, APU2, and one or more APU3s as being the APU that is configured with a beam direction being closest to pointing to the; and
- send to the selected antenna processing unit, a command to serve the UE with the selected antenna processing unit using the beam direction being closest to pointing to the UE.

20. The network node according to claim 14, further configured to configure of the first beamforming unit, the second beamforming unit, and one or more third beamforming units by performing it such that the beam patterns of the set of beams of APU1, APU2, and one or more APU3s complement each other to achieve an angular radio coverage.

* * * * *